United States Patent [19]
Gindy et al.

[11] Patent Number: 4,616,511
[45] Date of Patent: Oct. 14, 1986

[54] TACTILE SENSOR

[75] Inventors: Sherif S. Gindy; Ronald R. Tremonti, both of Troy, Mich.

[73] Assignee: Eaton Corporation, Cleveland, Ohio

[21] Appl. No.: 703,353

[22] Filed: Feb. 20, 1985

[51] Int. Cl.[4] .......................... G01L 5/16; G01G 3/14; B25J 15/02; B25J 19/00
[52] U.S. Cl. ............................... 73/862.04; 177/211; 177/229; 414/5; 414/730; 901/33; 901/34; 901/46
[58] Field of Search .......................... 901/9, 33, 34, 46; 414/5, 730; 73/862.04; 177/211, 229

[56] References Cited

U.S. PATENT DOCUMENTS

| | | | |
|---|---|---|---|
| 3,340,726 | 9/1967 | Armstrong et al. | 73/862.04 X |
| 3,824,674 | 7/1974 | Inoyama et al. | 901/34 X |
| 3,948,093 | 4/1976 | Folchi et al. | 901/34 X |
| 4,132,318 | 1/1979 | Wang et al. | 901/34 X |
| 4,283,764 | 8/1981 | Crum et al. | 901/46 X |
| 4,396,079 | 8/1983 | Brendel . | |
| 4,401,173 | 8/1983 | Komoto | 177/211 X |

OTHER PUBLICATIONS

J. Rebman et al, A Robust Tactile Sensor for Robot Applications, Aug. 7–11, 1983, ASME Proceedings, Chicago, Ill.
Fred Hapgood, Inside a Robotics Lab: The Quest for Automatic Touch, Apr. 22, 1983, Technology Illustrated, pp. 19–22.
L. D. Harmon, Automated Tactile Sensing, International Journal of Robotics Research, vol. 1, No. 2, Summer 1982, pp. 3, 4 & 12.
Lord Tactile Sensors Brochures, Lord Corporation, 407 Gregson Dr., Cary, N.C. 27511.

*Primary Examiner*—George H. Miller, Jr.
*Attorney, Agent, or Firm*—C. H. Grace; A. E. Chrow

[57] ABSTRACT

A load plate is rigidly supported by a central pedestal strain gaged for bending about a central axis. In one embodiment, the pedestal is mounted to the center of a yoke bar supported by two legs strain gaged for comprehensive loads only the sum of which is indicative of the magnitude of the plate load. The legs are supported by base webs strain gaged for bending about a central axis orthogonal to the axis of pedestal bending. The output of the bending strain gages enables determination of the coordinates of the load location on the plate from the central axis axes.

In a second embodiment, the pedestal is supported by a block rigidly attached to the end of a cantilevered member extending at right angles from the pedestal. The cantilever member is strain gaged at two longitudinal stations for reading the differential of the bending strain to thereby determine the shear loading, or plate tactile load. One of the coordinates of the applied load on the plate is determined from the output of the pedestal bending strain gages and the other coordinate from one of these bending strain gage sets on the cantilever member.

An optional bellow over the cantilever member provides in reared torsional stiffness without decreasing bending sensitivity.

3 Claims, 9 Drawing Figures

TACTILE SENSOR

BACKGROUND OF THE INVENTION

The present invention relates to sensors of the type employed by robotic operators for sensing the load experienced by contacting a work article. In particular, the invention relates to electrically operated transducers employed for giving a robotic operator a sense of "feel", by providing electrically a signal indicative of the magnitude and location of the tactilely sensed force applied by the robotic operator contacting the work article.

An example of a tactile sensor or transducer for a robotic operator is that shown and described in copending application Ser. No. 672,544 filed Nov. 19, 1984 entitled "A New Concept for a Two-dimensional Tactile Sensor" which is assigned to the Assignee of the present invention. The aforementioned tactile sensor employs a load sensing plate simply supported by a plurality of spaced simple supports with each support strain gaged to indicate the individual reaction load experienced thereby upon contact of the plate with a work article. The output of the strain gages in the aforementioned device is processed by suitable known relationships for beam support to provide the sum of the individual support reaction loads to give the total load on the plate. The aforementioned tactile sensor also describes a technique for calculating the coordinates of the load applied to the plate, irrespective of its location on the plate, from the outputs of the strain gages on the individual supports and to provide a continuous electrical readout of such coordinates.

The aforementioned tactile load transducer, although capable of providing a continuous electrical readout of the magnitude and location of the sensed tactile load, is limited in compactness for any given desired level of forced sensitivity, by the distance between supports for the sensing plate and the bending stiffness of the plate. Where it is desired to provide a tactile load transducer or sensor having a high degree of load sensitivity yet have the capability to withstand relatively high loads, the plate must of necessity be relatively stiff. A load plate which is itself stiff in bending requires, therefore, enough distance between supports to provide high enough bending strains to enable the strain gages to give an adequate signal for light tactile loads or low level plate deflection. The aforementioned multiply supported plate tactile sensor thus is inherently limited in its compactness, or, stated otherwise, is bulky and not capable of compact design for a given load sensitivity application where size is of paramount importance.

Thus, it has long been desired to provide a way or means of reducing the size of a tactile load sensor or transducer for robotic operator applications without sacrificing the capability for withstanding heavy contact loads, yet retaining the sensitivity to small contact loads.

SUMMARY OF THE INVENTION

The present invention provides a tactile load sensor suitable for robotic operators to thereby provide a sense or "feel" for the robotic operator. The sensor or transducer of the present invention provides a continuous electrical output which may be processed to determine both the magnitude of the load experienced by the transducer in contacting a work article and also determine the coordinates of the point of application to the transducer of the tactilely sensed load.

The transducer load sensing plate of the present invention is centrally supported by a single pedestal which is strain gaged to sense bending loads about a single axis. The pedestal is supported by a yoke, the arms of which are strain gaged to sense reaction loads in the direction normal to the plate's surface and the gages on the legs of the yoke are otherwise insensitive to bending. The entire yoke is supported by a single or plural spaced base supports which are strain gaged to sense bending strain about an axis orthogonal to the axis of the bending strains in the single pedestal. The plate support pedestal, the yoke and the base supports are preferably integrally formed from a unitary members to provide a homogeneous structure having a uniform modulus of elasticity. The strain gages employed to the desired portions of the member thus provide strain measurements of strain resulting from the load applied to the plate.

The strain gages disposed on the plate support pedestal are wired in a Wheatstone bridge circuit to give a signal output indicative of bending strains due to the applied load about the $M_y{}^y$ axis. The strain gages disposed on the base support for the yoke are wired in a separate Wheatstone bridge circuit to provide a signal indicative of bending strains due to the applied load about the $M_x{}^x$ axis. The strain gages on the legs of the yoke are series wired in a common Wheatstone bridge circuit to provide a signal indicative of the total of the individual reaction loads experienced by the yoke legs. The output of the three bridge circuits is then combined and processed to give continuous information as to the x and y coordinates for the location of the applied load, $F_z$, on the surface of the plate and also the magnitude of the applied load. The present invention thus provides a tactile load sensor which provides a continuous electrical readout of the magnitude and location of a tactilely sensed load on the load plate and can therefore track a moving load. The tactile load sensing transducer of the present invention thus provides a unique tactile sensor capable of providing improved load sensitivity yet resistant to relatively high loads and provides such capability in a minimum volume or compact configuration.

In a second embodiment, the transducer comprises an arm cantilevered from a base extending in a horizontal direction with the arm having strain gages disposed at plural stations therealong for measuring bending strain about an axis normal to the direction of the elongation of the arm. The strain gages on the arm at one station are wired in a common Wheatstone bridge and the strain gages at another station are wired in a common bridge circuit. The comparison of the bridge circuit outputs at two longitudinal stations, a known distance apart, permits calculation of differential strain which is independent of the point of application of the load and therefore a measurement of the magnitude of the applied load. The free end of the cantilever member has attached thereto a block for rigid connection of a support pedestal extending at a right angle to the direction of elongation of the cantilever member. The support pedestal has rigidly attached to the free end thereof, a load sensing plate, the surface of which extends in generally parallel arrangement to the direction of elongation of the cantilever member and bending strain axis thereof. The plate support member is strain gaged to provide bending strain measurement about an axis generally parallel to the direction of elongation of the cantilever member. The gages on the plate support are wired in a common Wheatstone bridge circuit. The output of the strain gages at one longitudinal station on the cantilever member and the strain gages on the plate support member are used to determine the location coordinates for the tactilely sensed load applied to the plate.

An option flexible metal bellows may be received over the cantilever member for providing improved torsional stiffness of the cantilever member.

The alternate embodiment of the invention is particularly suitable for robotic operator installations where the tactile sensor is intended to be installed at the end of an elongated operator arm.

DETAILED DESCRIPTION

Figure 1:
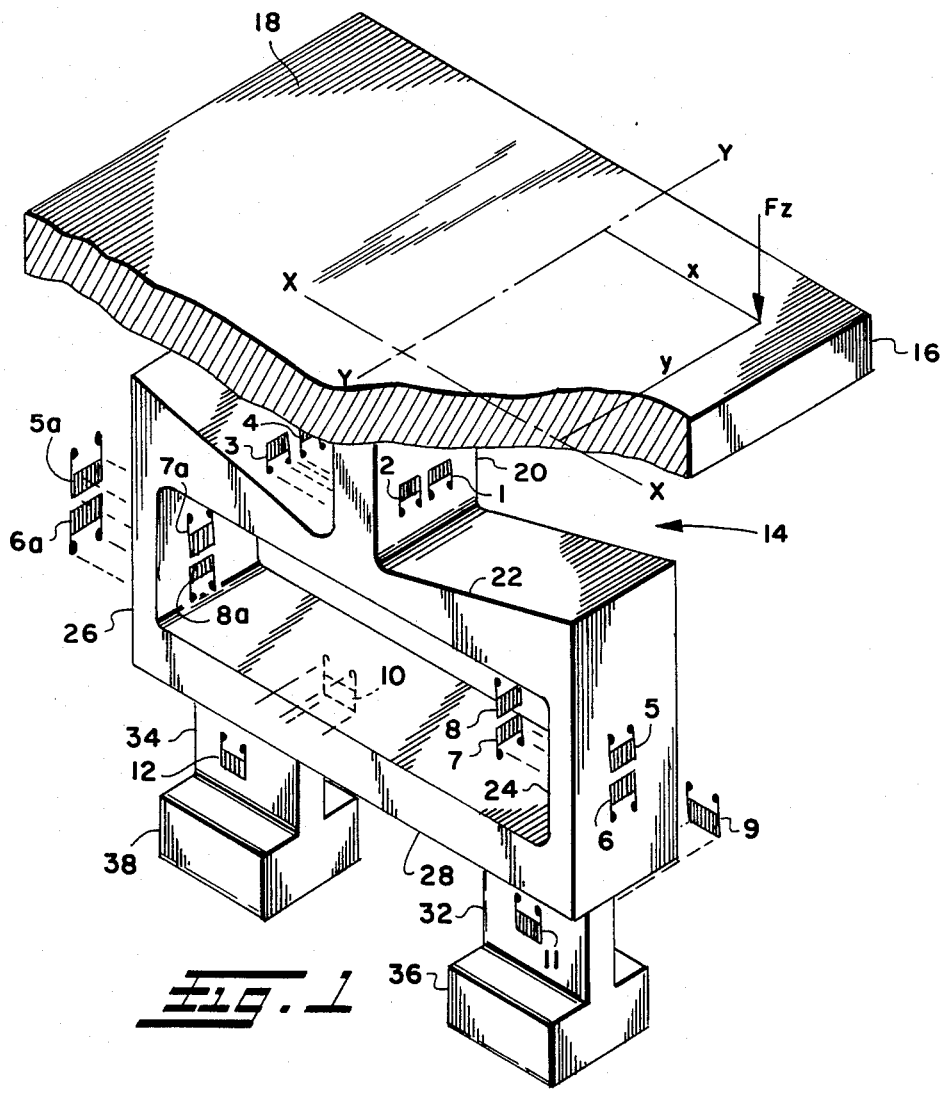
FIG. 1 is a somewhat perspective view of the embodiment of the invention employing a yoke member for supporting the sensing plate.

Referring now to FIG. 1, the sensor indicated generally at 14 has a load plate 16 having a load receiving surface 18 upon which contact is made anywhere thereupon with a work article as indicated by the arrow denoted $F_z$ in FIG. 1. The applied force $F_z$ is located a distance "x" from the central axis Y—Y and a distance "y" from the orthogonal central axis X—X.

The load plate 16 is centrally supported by rigid moment resisting connection such as, for example, weldment or bolted flange to a supporting pedestal 20 having a generally rectangularly-shaped transverse section and elongated in a direction perpendicular to the surface 18 of the plate. The pedestal 20 has the shortest dimension or width of the transverse section thereof sufficiently small such as to permit the pedestal to undergo a desired amount of bending about an axis parallel to the Y—Y axis so as to produce suffcient bending strains in the pedestal 20 to permit adequate strain sensing when the plate is subjected to the minimum load moment for which sensing is required.

The pedestal 20 has its base rigidly attached in moment resisting connection to a yoke bar portion 22 extending outwardly from the pedestal in opposite directions normal to the Y—Y axis and supported at the ends thereof by suitable legs 24, 26. The lower end or base of each of the legs 24, 26 is rigidly connected in moment resisting manner to a rigid transverse member 28 which extends in generally spaced parallel arrangement to the yoke bar 22.

At least one, and preferably two vertically extending support portions 32, 34 are provided for attachment to the member 28 and disposed at opposite ends thereof as shown in in FIG. 1. It will be understood, however, that the support portion may comprise a continuous portion extending along the entire undersurface of the member 28. Irrespective of the choice of single or plural support, each of the support portions 32, 34 has its upper end thereof rigidly attached to the member 28 in moment resisting attachment. The support portion 32, 34 each have the transverse section thereof configured to a generally rectangular shape with the longest dimension of the transverse section extending parallel to the X—X axis to permit the support portion 32, 34 to resiliently bend in a direction at right angles to the bending of the pedestal 20.

Each of the support portions 32, 34 is attached to a base adapted for mounting the sensor to a robotic operator, the base being shown by flanges 36, 38 in FIG. 1. It will be understood, that the base flanges 36, 38 may be attached to the robotic operator in any convenient manner, as for example, bolting or by weldment.

Figure 2:
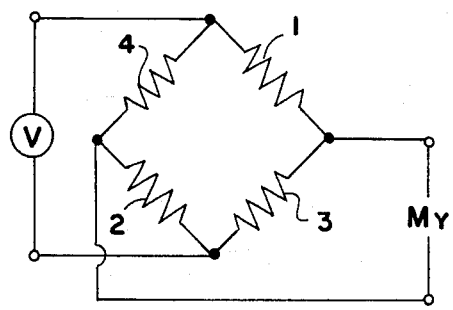
FIG. 2 is an electrical schematic of the strain gaged circuit for the gages employed on the pedestal portion of the embodiment of FIG. 1.

Referring now to FIGS. 1 and 2, strain gages denoted by reference numerals 1 and 2 are applied to the surface of the pedestal 20 on one side thereof; and, a pair of strain gages 3, 4 are applied to the opposite side of the pedestal for measuring bending strain in the pedestal resulting from application of the sensed load $F_z$ applied to surface 18 of the load plate.

As shown in FIG. 2, gages 1 and 2 are located in opposite legs of a Wheatstone bridge and gages 3 and 4 are located in the remaining legs of the bridge to average the affect of tensile and compressive bending strains; and, the output signal of the bridge circuit is an indication of the strain proportional to the moment about the Y—Y axis due to the applied load as described by the expression $F_z(x) = M_y$.

As will be understood by those skilled in the art, the stress "s" on the surface of the pedestal is determined by the expression $M_y c/I$, where "c" is the distance of the strain gaged surface from the centroidal axis of the pedestal transverse section (the Y—Y axis) and I is the transverse section moment of inertia of the pedestal about the centroidal axis of the pedestal parallel to the Y—Y axis. The bending strain measured by the gages on the surface "e" is then determined by the expression s/K where K is Young's modulus for the particular material employed.

Figure 3:
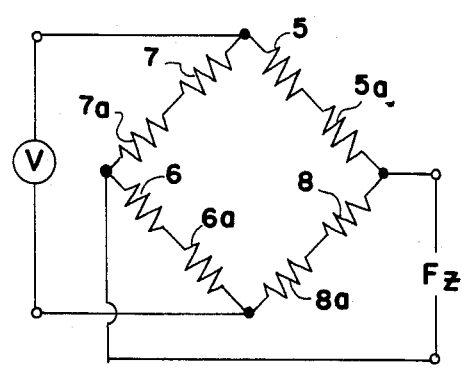
FIG. 3 is an electrical schematic for the strain gage bridge circuit of the strain gages on the legs of the yoke of the FIG. 1 embodiment.

Referring to FIGS. 1 and 3, a pair of strain gages 5, 6 is mounted on the outside face of the yoke leg 24 with the gages disposed in tandem vertically. A second pair of gages 7, 8 are mounted on the inner surface of leg 24 in vertical tandem arrangement. The gages 5 and 6 are disposed in opposite legs of a Wheatstone bridge circuit as shown in FIG. 3; and, the gages 7 and 8 are disposed oppositely in the bridge in the remaining arms. A second set of strain gages is disposed on the opposite yoke leg 26 with a pair of gages 5a, 6a disposed vertically in tandem on the outer face of the leg 26. A second pair of 7a, 8a is disposed vertically in tandem on the inner face of leg 26.

Gage 5a is disposed in series with gage 5 in a common arm of the bridge circuit; and, gage 6a is disposed in series with gage 6 in a common arm of the bridge. Gage 7a is series connected in a common arm of the brige with gage 7; and, gage 8a is series connected in a common bridge arm with gage 8 as shown in FIG. 3. The bridge circuit of FIG. 3 thus sums the direct compressive strains in the legs 24, 26 to give an output indicative of the total reaction loads experienced by the yoke legs, which strains are proportional to the magnitude of the load $F_z$. This arrangement filters out any effect of $M_y$.

Figure 4:
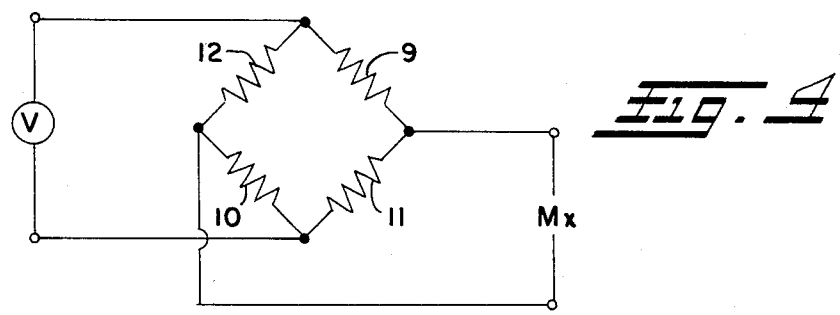
FIG. 4 is an electrical schematic of the bridge circuit for the strain gages employed on the base supports of the FIG. 1 embodiment.

Referring now to FIGS. 1 and 4, a pair of strain gages 9, 11 are mounted on the opposite faces of base support 32 and aligned for sensing tensile and compressive strains therein upon bending about an axis parallel to the X—X axis. Gages 9 and 11 are mounted in adjacent arms of the Wheatstone bridge circuit as shown in FIG. 4. A corresponding pair of gages 10, 12 are mounted respectively on opposite side faces of the base support 34; and these are disposed in adjacent arms of the bridge with gage 10 in an arm opposite gage 9 and gage 12 in an arm opposite gage 11, as shown in FIG. 4. The output of the bridge circuit having gages 9, 10, 11 and 12 therein provides an electrical signal indicative of the bending strains imposed by the moments $M_x$, which is equivalent to the product of the sensed load $F_z$ times the distance "y" from the X—X axis.

It will thus be apparent that the electrical signals provided by the Wheatstone bridge circuits shown in FIGS. 2, 3 and 4 provide a continuous readout of strains from which the coordinates x, y may be computed for the location of the applied load $F_z$ and the magnitude of the load $F_z$. The coordinate "x" being determined from the expression $x = M_y/F_z$ and coordinate "y" from the expression $y = M_x/F_z$.

Figure 5:
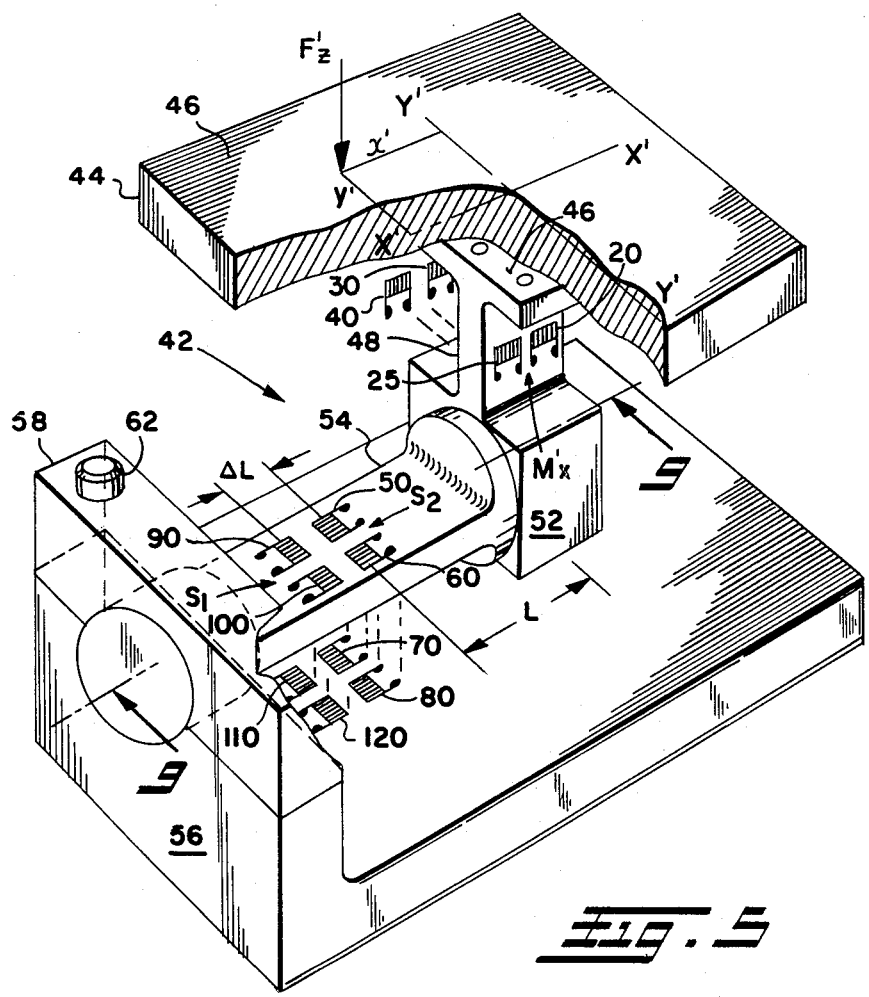
FIG. 5 is a somewhat perspective view of an alternate embodiment of the invention employing an elongated cantilever arm mount.

Referring now to FIG. 5, an alternate embodiment of the invention transducer is indicated generally at 42 wherein a load plate 44 has the tactile load to be sent $F_z'$ applied to the surface 46 thereof. The load $F_z'$ is applied to any point on the surface 46 and is located thereon by coordinates x', y' where the coordinate x' indicates the distance from central axis Y'—Y'; and, the coordinate y' denotes the distance of the applied load from the X'—X' axis.

The plate 44 is supported by rigid attachment to a mounting flange 46 which is provided on the upper end of a vertically extending pedestal 48 which has the base thereof rigidly connected, in a moment resisting manner, to a block portion 52. Block portion 52 is rigidly attached in a moment resisting manner to the free end of an elongated member 54 which extends from the block portion 52 in a direction generally parallel to the X'—X' axis and at right angles to the verticle pedestal 48, and also at right angles to the Y'—Y' axis.

The end of the elongated member 54 is anchored or secured to a base 56, from a generally vertically extending flange portion thereof, such that elongated member 54 extends horizontally in cantilever from the base 56. In the embodiment illustrated in FIG. 5, the anchored end of the cantilever member 54 is secured to base 56 by a cap member 58 bolted to the base by cap screws, one of which is shown typically at 62.

The elongated cantilever member 54 has the cross section thereof, taken in a direction transverse to the elongation, formed to a generally rectangular configuration such that the width or thickness thereof in the vertical direction in FIG. 5 is small with respect to the width of the cross section in a direction parallel to the Y'—Y' axis, thereby rendering the member 54 resiliently deflectable in bending with moment loading applied by the vertical forces acting through pedestal 48 and block 52 on the end of the cantilever member 54.

Figure 6:
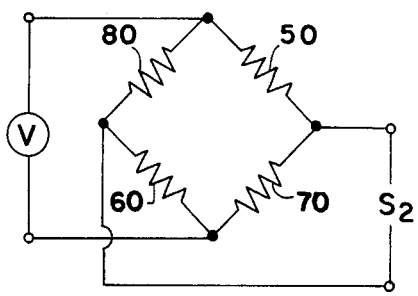
FIG. 6 is an electrical schematic of the bridge circuit for the strain gages employed at one longitundinal station of the elongated member of FIG. 5.

Referring to FIGS. 5 and 6, a pair of strain gages 50, 60 are disposed at the longitudinal station "L", as measured from the center of block portion 52, along the upper surface of member 54 in side-by-side spaced arrangement and oriented to sense longitudinal tensile bending strains. The gages 50, 60 are disposed in opposite legs of a Wheatstone bridge circuit as shown in FIG. 6. A like pair of strain gages 70, 80 are disposed at a common longitudinal station, and in the same spaced arrangement and orientation, on the undersurface of the member 54 for sensing compressive bending strains therein. Gages 70, 80 are wired in the remaining opposite arms of the bridge as shown in FIG. 6, such that the output of the bridge circuit, denoted $S_2$, is indicative of the average of the tensile and compressive bending strain at the longitudinal station "L".

Likewise, a set of strain gages indicated generally at $S_1$ in FIG. 5, is disposed at a longitudinal station spaced from gages $S_2$ by a predetermined distance $\Delta L$. The set of gages $S_1$ comprises a pair of gages 90, 100 transversely spaced on the upper surface of member 54 and oriented to sense tensile bending strains thereon in the longitudinal direction. A second pair of strain gages 110, 120 is similarly disposed on the under surface of member 54 at a common longitudinal station with gages 90, 100; and, gages 110, 120 are transversely spaced and oriented to sense compressive bending strain in the longitudinal direction of member 54.

Figure 7:
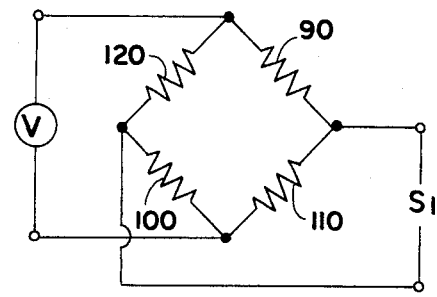
FIG. 7 is an electrical schematic of the bridge circuit for the strain gages employed at another longitudinal station of the elongated member of FIG. 5.

Referring to FIG. 7, tensile gages 90, 100 are disposed in opposite legs of the Wheatstone bridge circuit and compressive sensing strain gages 110, 120 are disposed in the remaining opposite legs of the bridge. The output of the bridge circuit in FIG. 7 for the gages denoted $S_1$ provides an electrical signal indicative of the average of the tensile and compresive bending strains at the common longitudinal station on member 54. It will be understood by those skilled in the art that the differential of the bending strains measured at the longitudinal stations $S_1$, $S_2$ provides a strain measurement which is independent of the bending moment, and thus indicative of the magnitude of the shear loading, or in this case the applied load $F'_z$. Thus, the difference in signal of the bridges $S_1$, $S_2$ yield a continuous readout of the magnitude of the tactilely sensed load on the plate surface 46.

It will be further understood that the output of either of the bridge circuits $S_1$, $S_2$ individually may be used as an indication of the bending moment applied to the cantilever 54 by the tactile load $F_z'$ and used to calculate the coordinate x'. If the bridge circuit $S_2$ signal is used, the coordinate x' is found by the expression $F'_z (L-x') = S_2$; and, if the bridge network $S_1$ is employed, the coordinate x' is found from the expression $F_z' (\Delta L + L - x') = S_1$.

Figure 8:
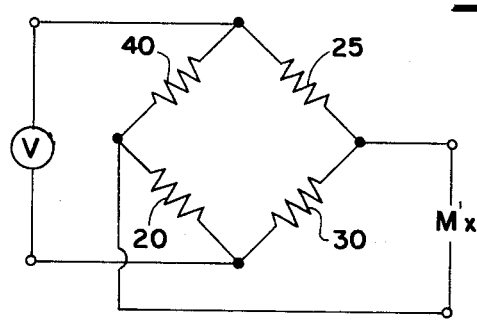
FIG. 8 is an electrical schematic of the bridge circuit for the strain gages employed on the load plate pedestal of the embodiment of FIG. 5; and, FIG. 9 is a section view taken along section indicating lines 9—9 of FIG. 5 and illustrates an optional torsion resisting bellows.

Referring to FIGS. 5 and 8, the strain gages on the vertical pedestal 48 comprise a pair of gages 20, 25 disposed in transversely spaced arrangement at a common longitudinal station therealong and oriented to sense tensile or compressive bending strains in the longitudinal, or vertical direction in FIG. 5, of the pedestal 48. A second pair of gages 30, 40 are similarly disposed in transversely spaced arrangement at a common station with gages 20, 25 on pedestal 48 and disposed on the opposite face thereof from gages 20, 25 so as to indicate bending strain in the opposite sense. As shown in FIG. 8, gages 20, 25 are disposed in oppositely disposed legs of a Wheatstone bridge circuit; and, gages 30, 40 are disposed in the remaining opposite legs of the bridge circuit, the output of which is denoted $M'_x$ in FIG. 8. The $M'_x$ bridge circuit of FIG. 8 thus provides a continous electrical readout of the average of the compressive and tensile bending strains in the pedestal 48 resulting from the application of the tactilely sensed load $F'_z$. The value of the coordinate y' of the tactile load on plate 46 from the X'—X' axis may be determined from the expression $F'_z (y') = M'_x$.

The embodiment of FIG. 5 thus provides a centrally supported tactile load receiving plate 44 with a cantilever mounting arm 54 extending from the pedestal 48 at generally right angles thereto, in a direction parallel to the surface of the plate to thereby provide a compact configuration rendering the transducer 42 particularly suitable for mounting at the end of a robotic arm operator. In this regard, it will be understood that the base 56 may have any suitable configuration convenient for mounting on the robotic arm.

Figure 9:
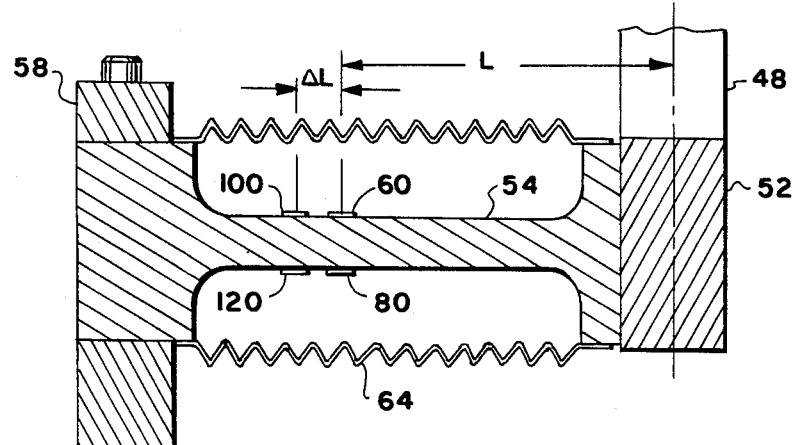

Referring now to FIG. 9, an optional feature of the embodiment of FIG. 5 is shown wherein a bellows, preferably formed of metallic material, is received over the cantilever member and has one end thereof anchored to the structure at opposite ends of the member 54. The bellows has a sufficiently thin wall to permit negligible resistance to bending about an axis parallel to the Y'—Y' axis. However, the bellows, by virtue of its metallic construction and diameter provides substantial torsional stiffness and resistance to twisting of the member 54 to thereby preclude bending moments about an axis parallel to the X'—X' axis from influencing the readings of the strain gages and bridges $S_2$ and $S_1$. The optional bellows of FIG. 9 thus may be employed to enable a use of a thinner transverse section for member 54 for increased bending sensitivity for a given length of the member 54 and thus greater sensitivity for the measurement of the magnitude of $F'_z$ independently of the bending moment sensitivity of the vertical pedestal 48.

The present invention thus provides a unique load transducer providing continuous electrical readout of the magnitude and coordinates for location of the point of contact with the work article on the transducer load plate and yet provide a transducer which has a high degree of force and moment sensitivity combined in a compact configuration. Although the invention has hereinabove been described with respect to the illustrated embodiments, it will be understood that the invention is capable of modification and variation and is limited only by the following claims.

We claim:

1. A tactile transducer for determining location and magnitude of an applied load upon a load plate comprising:
    (a) an elongated vertically extending pedestal portion having the transverse section thereof having a greater width in one of two orthogonal directions, said pedestal portion movement deflection sensitive about an "Y" axis in the direction of said greater transverse width;
    (b) a yoke bar portion having the base end of said pedestal portion attached intermediate the ends thereof;
    (c) a plurality of spaced vertical load sensing leg portions disposed one at each opposite end of said yoke bar portion and joined integrally thereto in rigid moment deflection resisting attachment,
    (d) a rigid transverse member interconnecting the opposite ends of said vertical load sensing leg members;
    (e) at least one support member having one end thereof joined to said transverse member on and extending therefrom in a direction opposite said vertical load sensing leg poritons, said support member operatively moment sensitive about an "X" axis orthogonal to said "Y" axis;
    (f) an attachment base portion on the end of said support member remote from said transverse member;
    (g) said load plate rigidly secured to said pedestal in moment deflection resisting connection for transmitting therethrough moments applied to said plate; and,
    (h) electrical strain gage means disposed on said pedestal portion, said vertical load sensing leg portions and said support member, said strain gage means on all of said vertical load sensing leg portions having the signals therefrom summed to provide an indication of the total load $F_z$ applied to said load plate, said strain gage means on said pedestal portion providing a signal indicative of the distance y in a direction normal to said "X" axis along said load plate from the center of said pedestal portion of application of $F_z$ in accordance with the expression $y = F_z/M_x$ wherein $M_x$ is the bending moment of $F_z$ about the "X" axis, said strain gage means on said support member providing a signal indicative of the distance x in a direction normal to said "Y" axis along said load plate from the center of said pedestal of application of $F_z$ in accordance with the expression $x = F_z/M_y$, where $M_y$ is the bending moment of $F_z$ about the "X" axis.

2. A tactile transducer for determining loaction and magnitude of an applied load upon a load plate comprising:
    (a) a reaction base having an elongated member resiliently deflectable in bending extending in cantilever therefrom in a first direction, said member having the transverse section thereof configured to render said member bendable about a "Y'" axis transverse to said first direction of elongation;
    (b) an elongated pedestal member having one end rigidly attached to the end of said cantilever member, said attachment substantially unstrained under moment loads with said member extending at a right angle to said "Y'" axis and said first direction of elongation of said cantilevered member, said pedestal member having the transverse action thereof configured to render said member bendable about an "X'" axis normal to said "Y'" axis and parallel to said first direction of elongation of said cantilevered member;
    (c) a load plate member rigidly attached to the remaining end of said pedestal member in a manner generally unstrained under moment loads, said load plate adapted to receive a tactile load $F_z$ anywhere on the surface thereof;
    (d) electrical strain gage means disposed at a first longitudinal station $L_1$ on said cantilever member and operative to sense strain thereof due to bending about said "Y'" axis and operative to emit an electrical signal accordingly;
    (e) electrical strain gage means disposed on said pedestal member and operative to sense bending strains thereof at said first station due to bending about an axis therethrough parallel to said "X'" axis and operative to emit an electrical signal $M_x$ representative thereof; and (f) electrical strain gage means disposed on said cantilever member at a second longitudinal station $L_2$ spaced or predetermined distance $\Delta L$ from said first longitudinal station and operative to sense bending strains thereof at said second station dut to bending about an axis therethrough parallel to said "Y'" axis and operative to emit an electircal signal $S_2$ representative thereof, wherein the magnitude of the tactilely sensed load $F_z$ is determined by the expression $S_1 - S_2/\Delta L$, the distance x of $F_z$ from the "Y'" axis is determined by the expression $L-S_2$, and the distance y of from the "X'" axis is determined by the expression $M_x/F_z$.

3. The tactile transducer defined in claim 2, further comprising tubular means disposed about said cantilever member having an end thereof anchored to the end of said member adjacent said reaction base and the other end of said tubular means anchored to the end of said member adjacent said rigid attachment to said pedestal member, said tubular means operative to substantially increase the torsional stiffness of said cantilever member without significantly altering the bending stiffness thereof.

* * * * *